United States Patent
Kandleinsberger et al.

(10) Patent No.: US 8,134,632 B2
(45) Date of Patent: **\*Mar. 13, 2012**

(54) DIGITAL CAMERA

(75) Inventors: Robert Kandleinsberger, Munich (DE);
Tran Quoc Khanh, Munich (DE);
Michael Koppetz, Munich (DE);
Hermann Popp, Munich (DE)

(73) Assignee: Arnold Richter Cine Technik GmbH and Co. Bertriebs KG (DE)

( * ) Notice: Subject to any disclaimer, the term of this patent is extended or adjusted under 35 U.S.C. 154(b) by 411 days.

This patent is subject to a terminal disclaimer.

(21) Appl. No.: 12/124,065

(22) Filed: May 20, 2008

(65) Prior Publication Data

US 2008/0284898 A1    Nov. 20, 2008

Related U.S. Application Data

(62) Division of application No. 10/355,937, filed on Jan. 31, 2003, now Pat. No. 7,391,456.

(30) Foreign Application Priority Data

Mar. 8, 2002   (DE) ................................. 102 10 327

(51) Int. Cl.
*H04N 5/225*   (2006.01)
*H04N 5/238*   (2006.01)
(52) U.S. Cl. .................... 348/335; 348/341; 348/367
(58) Field of Classification Search .................. 348/341, 348/344, 367–369, 221.1
See application file for complete search history.

(56) References Cited

U.S. PATENT DOCUMENTS

| | | |
|---|---|---|
| 5,060,074 A | 10/1991 | Kinugasa et al. |
| 5,122,881 A * | 6/1992 | Nishizawa et al. |
| 5,162,914 A | 11/1992 | Takahashi et al. |
| 5,196,938 A | 3/1993 | Blessinger |
| 5,218,441 A | 6/1993 | Karcher |

(Continued)

FOREIGN PATENT DOCUMENTS

DE   36 03 552 C2   9/1987

(Continued)

OTHER PUBLICATIONS

Jacoby et al., "Electronics in the New Generation of Arriflex Cameras." SMPTE Journal 100:880-883 (Nov. 1991).

(Continued)

*Primary Examiner* — Luong T Nguyen
(74) *Attorney, Agent, or Firm* — Amster, Rothstein & Ebenstein LLP

(57) ABSTRACT

The invention relates to a digital motion picture camera including at least one optoelectronic sensor device for the recording of motion pictures. The sensor device has, in an areal arrangement, a plurality of sensor elements for the generation of a respective received signal in dependence on a light exposure. The camera further has a control device for the controlling of the read-out of the received signals of the sensor elements as well as a digitizing device for the digitizing of the received signals. The camera moreover has an optical viewfinder for the visual observation of the motion pictures to be recorded and a beam deflection device which is interposed in front of the sensor device and by which the reception beam path can be split at least into one recording beam path for the sensor device and one viewfinder beam path for the optical viewfinder. The sensor device can be controlled by the controlling device for the recording of the motion pictures at a pre-settable variable picture recording frequency.

24 Claims, 4 Drawing Sheets

U.S. PATENT DOCUMENTS

| | | | |
|---|---|---|---|
| 5,654,537 A | 8/1997 | Prater | |
| 5,764,285 A * | 6/1998 | Ochi et al. | 348/222.1 |
| 6,252,989 B1 * | 6/2001 | Geisler et al. | |
| 6,305,853 B1 * | 10/2001 | Bishay et al. | |
| 6,307,590 B1 | 10/2001 | Yoshida | |
| 6,356,664 B1 * | 3/2002 | Dunn et al. | |
| 6,566,647 B1 * | 5/2003 | Spears | |
| 6,669,099 B2 | 12/2003 | Fujimura et al. | |
| 6,757,018 B1 | 6/2004 | Fowler | |
| 6,757,021 B1 * | 6/2004 | Nguyen-Nhu | 348/362 |
| 6,778,220 B2 * | 8/2004 | Glenn | 348/368 |
| 6,809,766 B1 * | 10/2004 | Krymski et al. | |
| 6,844,912 B2 | 1/2005 | Filous et al. | |
| 6,882,368 B1 * | 4/2005 | Suda | |
| 6,906,746 B2 | 6/2005 | Hijishiri et al. | |
| 6,975,355 B1 | 12/2005 | Yang et al. | |
| 6,982,758 B2 | 1/2006 | Rossi | |
| 7,050,142 B2 * | 5/2006 | Valenzuela et al. | |
| 7,071,973 B1 * | 7/2006 | Yoshioka et al. | 348/219.1 |
| 7,110,027 B2 * | 9/2006 | Wyman | |
| 7,391,456 B2 * | 6/2008 | Kandleinsberger et al. | 348/335 |
| 2001/0030696 A1 * | 10/2001 | Glenn | |
| 2001/0030698 A1 * | 10/2001 | Glenn | |
| 2002/0114025 A1 | 8/2002 | Raynor et al. | |
| 2002/0126211 A1 * | 9/2002 | Kitajima | |
| 2003/0011747 A1 | 1/2003 | Lenz | |
| 2004/0081437 A1 * | 4/2004 | Asada et al. | |

FOREIGN PATENT DOCUMENTS

| | | | |
|---|---|---|---|
| DE | 39 03 625 C2 * | 6/1991 | |
| DE | 40 01 072 A1 * | 7/1991 | |
| DE | 41 23 203 C1 | 10/1992 | |
| DE | 41 28 185 A1 * | 2/1993 | |
| DE | 34 35 332 C2 * | 8/1993 | |
| DE | 42 19 331 A1 | 12/1993 | |
| DE | 43 04 506 A1 | 8/1994 | |
| DE | 44 23 172 C1 * | 9/1995 | |
| DE | 43 28 783 C2 | 5/1996 | |
| DE | 195 44 789 A1 * | 3/1997 | |
| DE | 196 41 617 A1 * | 4/1997 | |
| DE | 296 22 807 U1 * | 10/1997 | |
| DE | 196 52 477 A1 * | 6/1998 | |
| DE | 197 20 148 A1 * | 11/1998 | |
| DE | 694 15 876 T2 * | 8/1999 | |
| DE | 197 82 036 T1 * | 10/1999 | |
| DE | 695 09 475 T2 * | 11/1999 | |
| DE | 199 40 385 A1 * | 8/2001 | |
| DE | 100 26 596 C1 * | 12/2001 | |
| DE | 100 06 525 C2 * | 1/2002 | |
| DE | 100 33 751 A1 * | 1/2002 | |
| EP | 0 377 914 A1 | 7/1990 | |
| EP | 0 712 236 A1 | 5/1996 | |
| EP | 1 111 443 A1 | 6/2001 | |
| EP | 1 152 590 A2 * | 11/2001 | |
| EP | 1 168 833 A2 | 1/2002 | |
| EP | 1 343 312 B2 * | 4/2006 | |
| GB | 2 166 317 A | 4/1986 | |
| GB | 2255465 A * | 11/1992 | |
| JP | 02014675 | 1/1990 | |
| WO | WO 96/31050 | 10/1996 | |
| WO | WO 98/51075 | 11/1998 | |
| WO | WO 00/38415 A1 | 6/2000 | |
| WO | WO 00/51345 | 8/2000 | |
| WO | WO 00/51345 A1 | 8/2000 | |

OTHER PUBLICATIONS

Fossum, "CMOS Image Sensors: Electronic Camera-On-A-Chip." IEEE Transactions on Electron Devices 44, 10:1689-1698 (Oct. 1997).

Stough et al., "High-Performance Electro-optic Camera Prototype." SMPTE Journal, 140-146 (Mar. 2001).

Weber, "Frame-Transfer-CCD-Sensoren mit HD-DPM+-Technik in einer HD-Anwendung." Fernseh- und Kino-Technik—55. Jahrgang—Nr. 758-761 (Dec. 2001).

Erkelenz, "Digitale Kinematographie—mehr als 24p." Fernseh- und Kino-Technik—56, Jahrgang—Nr. 127-132 (Mar. 2002).

European Search Report dated May 30, 2005 for European Application No. 03 003 434.2 and English translation thereof.

German Patent Office Search report—Aug. 14, 2002 for DE 102 18 313.9.

German Examination Report in German dated Jul. 27, 2011.

* cited by examiner

DIGITAL CAMERA

RELATED APPLICATIONS

This application corresponds to and claims foreign priority benefits under 35 U.S.C. 199 (a)-(d) and (f) and 365 (b) based upon German application No. 102 10 327.5 filed Mar. 8, 2002.

BACKGROUND

The invention relates to a motion picture camera for full motion recordings of high picture quality such as television movies, cinema commercials, cinema movies or even industrial or medical applications. Motion picture cameras for the exposure of a photochemical negative film are known for such recordings. This recording technology allows a high resolution, large brightness dynamics and good color rendering. However, the development and the printing of such a negative film are undesirably complex and/or expensive since specialist equipment is required. Furthermore, it is required for an electronic picture processing, which has become customary in the meantime—for example for the changing of the color or for the insertion of synthetic picture elements—to subsequently digitize the exposed film material.

Digital video cameras are also known which record the recorded pictures with three CCD sensors provided for different colors and store them in a digital format on magnetic tape. Such cameras therefore have the advantage that the recorded film pictures are already present in digital form. However, such video cameras do not satisfy the demands occurring in all typical recording situations and are consequently not used in full motion recordings in which a particularly high picture quality is desired. For example, such a camera design with three CCD sensors requires recording lenses with a comparatively long back focal length, which is disadvantageous for the imaging performance of the optical systems. Furthermore, splitter prisms are required in the optical reception path which can likewise result in an unwanted reduction in the recording quality.

SUMMARY OF THE INVENTION

It is an object of the invention to provide a motion picture camera which allows a digital recording of motion pictures, on the one hand, and is suitable for use for full motion recordings of high picture quality, such as television movies, cinema commercials or cinema movies, on the other hand.

This object is satisfied by a digital motion picture camera which has at least one optoelectronic sensor device for the recording of motion pictures, a control device for the control of the read-out of the received signals of the sensor elements, a digitizing device for the digitizing of the received signals of the sensor elements, an optical viewfinder for the visual observation of the motion pictures to be recorded and a beam deflection device which is disposed in front of the sensor device and by means of which an optical reception path can be split at least into one recording optical path for the sensor device an one viewfinder optical path for the optical viewfinder, with the sensor device having a plurality of sensor elements in an areal arrangement for the generation of a respective received signal in dependence on a light discharge, and with the sensor device being controllable by means of the control device for the recording of the motion pictures with a pre-settable variable picture recording frequency.

In the motion picture camera in accordance with the invention, a sensor device is therefore provided having a plurality of photoelectrical sensor elements which each produce an electrical received signal. These received signals are digitized while still in the camera, optionally after amplification, so that the picture information is present directly in a digital format and can thus be electronically processed without problem and can be reproduced without substantial loss of quality.

A particular advantage of the digital motion picture camera in accordance with the invention lies in the fact that the frequency at which the sequential motion pictures are recorded can be varied, and indeed in a manner pre-settable by the user. The pictures can thereby be recorded at a different frequency to the one they should ultimately be reproduced at as a motion picture movie. This variability of the picture recording frequency allows fast motion shots which are desired, for example, for action scenes or for procedures which take place extremely slowly in order to make an action procedure appear faster than it actually takes during the recording. Furthermore, the variability of the picture recording frequency allows slow motion shots such as are likewise customary and desired for many full-motion recordings.

It is important for the invention that these advantages are achieved by a change in the frequency at which the sequential motion pictures are recorded and that the desired fast motion effects or slow motion effects are accordingly not produced by subsequent time interpolation of individual motion pictures. Interpolation artifacts are thereby avoided which can occur on the interpolation of motion pictures which have been recorded at a constant frequency such as is the case, for example, with the initially named CCD sensors.

It is, in contrast, unimportant for the realization of the invention whether the motion pictures are recorded as full frames or as half frames.

With the motion picture camera in accordance with the invention, the possibility is therefore provided of a deviation of the ongoing picture recording frequency from a base value of, for example, 24 frames per second (fps). This means that the individual recorded motion pictures have an increasing phase shift with respect to this base value of the picture recording frequency.

As a further advantageous feature of the digital motion picture camera in accordance with the invention, an optical viewfinder is provided which allows a visual observation of the motion pictures to be recorded and at least one beam deflection device is arranged in front of the sensor device to split the reception beam path pre-set, for example, by an optical recording system, into a recording beam path for the sensor device, on the one hand, and into a viewfinder beam path for the optical viewfinder, on the other hand.

The advantage of the obtaining of digitized received signals by means of the explained sensor device is thereby combined with the advantage of the use of an optical viewfinder which allows a direct observation of the film scene to be recorded. In contrast to conventional digital video cameras, which are equipped with an electronic viewfinder in the form of a display monitor for the reproduction of the recorded motion pictures, a corruption of the observation of the film scene with respect to the actually recorded film scene can be better avoided by the use of an optical viewfinder.

Such a corruption can namely result, for example, from a necessarily low resolution of a display monitor or from a color reproduction of such a display monitor which does not agree with the color sensitivity of the actual sensor device of the motion picture camera. These risks are avoided with the motion picture camera in accordance with the invention since the user can observe the film scene to be recorded directly, that is through the optical recording system of the camera.

A further advantage of the combination of a beam deflection device comprising an optical viewfinder consists of the fact that a picture section can be observed through the viewfinder which is larger than the picture section actually recorded by means of the sensor device. The cameraman can thus recognize objects which approach the actually recorded picture section and which, however, should not also be recorded. An accidental recording of a microphone at the edge of the picture section can, for example, thereby be recognized in time and prevented.

The said variation of the picture recording frequency can, for example, be realized with the motion picture camera in accordance with the invention in that the starting time point of the exposure of the sensor elements, that is the starting time point of the light release or the time point of the actual start of the received signal generation on the basis of a light release, takes place by a corresponding control at different time points or phase positions. The resetting or cancellation of a photoelectric sensor element can in particular take place at a time point pre-settable by the control device.

Alternatively or additionally, the picture recording frequency can be varied in that the control device causes the end of the exposure of a photoelectric sensor element at different points in time. This measure in particular results in different picture recording frequencies when the start of the exposure of a following motion picture does not take place in accordance with a fixed time pattern, but only in time reference to the (variable) end point in time of the previous exposure.

In both cases, or by combination of these two control measures, a phase shift of the picture recording with respect to a base value of the picture recording frequency is therefore achieved, with simultaneously a variation of the length of the exposure time being possible.

The desired variation of the picture recording frequency can also be realized in that the rate or frequency is varied at which the received signals of the individual sensor elements are sequentially reset or read out. In other words, a sequential read-out of the received signals of the sensor elements in accordance with a read-out cycle can be provided, with ultimately one single picture being recorded by the sequential read-out of all received signals. A fixed time pattern, and thus a specific base value of the picture recording frequency, can be deviated from by variation of this read-out cycle.

As regards the order of the read-out of the photoelectric sensor elements, it is possible for the control device first to sequentially cause a resetting or cancellation of all sensor elements and subsequently to sequentially read out the received signals of the sensor elements, that is to forward them to an amplification device and/or to the digitization device. In such a case, the already mentioned variation of the starting point in time and/or of the end point in time of the exposure is particularly suitable to realize the desired variation of the picture recording frequency.

Alternatively to this sequential read-out of the sensor elements, provision can also be made for the received signals of the photoelectric sensor elements to be read out in parallel or at least group-wise in parallel—for example divided according to different areal regions of the sensor device. This simplifies the realization of particularly high picture recording frequencies. The picture recording frequency can be varied here in that the sensor elements, or a group of sensor elements, are reset together at variable times and/or are read out at variable times.

The sensor device and the control device are preferably designed for a continuous variability of the picture recording frequency, for example by a continuous variability of the read-out cycle of the sensor elements. Alternatively to this, a variability of the picture recording frequency can be provided in pre-determined frequency steps, for example in that the picture recording frequency is changed in units of the read-out cycle with which the photoelectric sensor elements are read out sequentially. For example, after a sequential or simultaneous read-out of all sensor elements, it is possible to wait for the length of a pre-settable continuously variable or discretely variable waiting interval until the sequential read-out, or optionally the resetting of the sensor elements required for this, is begun again.

Each sensor element of the sensor device can have its own amplifier device for the amplification of the respective received signal and/or its own digitizing device associated with it. It is preferred in this case for the amplifier device or the digitizer device to be already integrated in the sensor device or in the corresponding semi-conductor component. For example, amplifiers and/or analog/digital converters can be integrated at the rear side of a photoelectric surface containing the sensor elements in a three-dimensional design of the sensor device.

Alternatively to this, it is also possible to provide a single amplifier device or at least a single digitizing device together for a plurality of, or all, sensor elements.

A particularly simple realization of the invention is possible by designing the sensor device in a CMOS design. Such a CMOS sensor allows the explained variation of the picture recording frequency and it permits a read-out of the sensor elements at a read-out cycle which is comparatively high—for example with respect to a CCD sensor—and thus at a high picture recording frequency. The picture recording frequency can thereby ultimately be varied within an advantageously large frequency range.

The said optical viewfinder of the motion picture camera in accordance with the invention can be designed for the generation of a real image which is reproduced, for example, on a focusing screen and can be observed there due to the grinding of the screen. Alternatively to this, the generation of a virtual image can be provided which can be observed by means of an associated optical system of a viewfinder. In both cases, an identification can be provided, as explained above, for the marking of the picture section actually recorded. It is furthermore of advantage for the optical viewfinder, the said focusing screen or the said optical system for a viewfinder to be provided as exchangeable modular components which can be used at the same time for other camera types.

A rotationally movable mirror diaphragm can be provided for the said beam deflection device which has at least one mirror coated deflection region and at least one transmission aperture which are, for example, each circular in shape. The recorded picture can alternately be imaged in the direction of the optical viewfinder and in the direction of the sensor device by rotation of the mirror diaphragm arranged in an inclined manner in the reception beam path: as soon as the deflection region is located in the reception beam path, the recorded picture is imaged in the direction of the optical viewfinder while the light exposure of the sensor device is interrupted. As soon as the transmission aperture is subsequently moved into the reception beam path, the recorded picture is imaged on the sensor device in order to allow the generation of received signals there.

The combination of such a mirror diaphragm with an optoelectronic sensor device has the particular advantage that, at the time of the recording of a motion picture by means of the sensor device, no attenuation or corruption of the recorded picture takes place by the upstream beam deflection device, with nevertheless an optical observation of the recorded film scene by means of the optical viewfinder being possible.

A further advantage consists of the fact that the exposure time of the optoelectronic sensor device can be controlled or influenced by means of the mirror diaphragm or by its rotational frequency such that the sensor device is not dependent on a purely electronic control of the picture recording frequency and of the exposure time; however, such an electromechanical control of the exposure time is not necessarily required.

Alternatively to the use of a mirror diaphragm, the said beam deflection device can be made as a beam splitter and, for example, comprise a partly transmissible mirror, a dielectric beam splitter or a holographic beam splitter. Such a design has the advantage that a recording of the motion pictures by means of the sensor device and an observation of the recorded motion pictures can always take place simultaneously since such a beam splitter always transmits the recorded picture recorded by the recording optical system partly in the direction of the sensor device and partly in the direction of the optical viewfinder.

Furthermore, in this embodiment, no mechanical rotational drive and no complex and/or expensive synchronization of such a rotational drive to the control of the read-out of the sensor elements are necessarily required since the picture recording frequency and the exposure time of the sensor elements can be controlled purely electronically. It is, however, possible to insert a rotationally movable rotational diaphragm between such a beam splitter and the sensor device which supports the control of the picture recording frequency or of the exposure time by a controlled electromechanical drive.

In a further embodiment of the motion picture camera in accordance with the invention, a control photo-sensor can be disposed downstream of the optical viewfinder in order to allow a control recording of the motion pictures recorded by means of the sensor device. Such a control recording can, for example, take place for the viewing of the recorded film scene on a separate display device, for example a high resolution monitor in an observation room and/or for the purpose of an additional recording of the film scene for documentation purposes.

In accordance with a further embodiment of the invention, a beam splitter device can be provided along the viewfinder beam path which again slits the viewfinder beam path into a control recording beam path and an observation beam path. The recorded picture is reproduced along the observation beam path in the direction of the optical viewfinder in order, as already explained, to make possible a direct visual observation there. The control recorded picture beam path, in contrast, leads to a control photo-sensor which—in addition to the photoelectrical sensor device—allows an additional control recording of the film scene for the purpose of the additional observation at a display device or for the purpose of an additional recording. The said beam splitter device is preferably formed by a partly transmissible mirror.

In the motion picture camera in accordance with the invention, as already mentioned, a purely electronic control of the picture recording frequency or of the exposure time of the sensor device can be provided, with the exposure time of the individual sensor elements, that is the starting point in time and/or the ending point in time of the received signal formation, being able to be controlled by means of the control device together for all, or for a part of the sensor elements or for each sensor element individually. It is ensured in the first case that the same exposure time is provided for all sensor elements such that the brightness values and color values of the motion picture recorded are recorded faithful to the original. A mutual control of only a part of the sensor elements, or an individual control of all sensor elements independently of one another, in contrast, allows the generation of received signals on the basis of different exposure times with respect to different sensor elements such that, for example, picture regions already identified as of comparatively low contrast can be recorded with a matched exposure time right from the start in order to nevertheless achieve a sufficiently large data depth for such picture regions.

Alternatively or additionally to the purely electronic control of the exposure time, a diaphragm device can be disposed upstream of the sensor device which allows an adjustment or limitation of the exposure time of the sensor device. Such a diaphragm device can, for example, as already mentioned, comprise a rotationally movable mirror diaphragm in the reception beam path. Alternatively or additionally to this, the diaphragm device can be formed by a rotationally movable rotational diaphragm which has one or more masking regions and one or more transmission apertures which are in particular circular in shape. The sensor device is alternately exposed to received light or masked by a rotational drive of such a rotational diaphragm.

The use of such a rotationally movable diaphragm device can be of particular advantage if the individual sensor elements of the sensor device are read out sequentially. Provided that the sensor elements are read out in such a case, for example in a matrix-like arrangement, line-wise starting from the top left to the bottom right, an unwanted phase shift can occur with respect to the matrix lines which is caused by the passing in the meantime of the time required for the read-out. By interposing a rotationally moved mirror diaphragm or rotational diaphragm, such a phase shift can be avoided or at least reduced to an acceptable degree—in accordance with the introduction or removal of the diaphragm boundary into and out of the reception beam path.

To be able to vary the picture recording frequency to the desired degree, it is preferred in the case of using a rotationally movable diaphragm device for its rotational frequency to be able to be variably controlled by means of the control device. In the event that the received signals of the individual sensor elements are read out sequentially in accordance with a read-out cycle, it is preferred for this read-out cycle and the rotational frequency of the diaphragm device to be able to be synchronized with one another by means of the control device.

In accordance with a further advantageous embodiment, the rotationally movable diaphragm device has a plurality of transmission apertures, with the picture recording frequency being a multiple of the rotational frequency of the diaphragm device corresponding to the number of transmission apertures. In other words, a new motion picture should be recorded at each point in time at which a new transmission aperture releases the reception beam path. Such a control of the picture recording frequency of the sensor device and of the rotational frequency of the diaphragm device has the advantage that high picture recording frequencies can still be achieved even with a comparatively low rotational frequency.

It is furthermore of advantage for the size or the angular range of a transmission aperture of the rotationally movable diaphragm device to be able to be variable controlled in order hereby to be able to control the exposure time of the sensor device in an electromechanical manner without simultaneously changing the rotational frequency of the diaphragm device.

In accordance with a further advantageous further development of the invention, the sensor device and the control device are designed such that the sensor elements can be controlled during an interruption of the incidence of light by means of the diaphragm device for the generation of reference reception signals. In other words, received signals can also be produced during a masking of the sensor elements. Said received signals serve as reference levels which can be offset with received signals which are produced during a light exposure of the sensor device, for example to take signal noise or temperature effects into account.

Within the context of a further advantageous further formation of the invention, it is possible to control the sensor elements by means of the control device such that a plurality of received signals are produced sequentially which correspond to different exposure times and are assigned to a single motion picture to be recorded. In particular after the start of the exposure of a reception element, that is after the required resetting or cancellation of this reception element, the received signal accumulated in each case in the meantime can be taken up at a plurality of sequential points in time without a repeated resetting or cancellation of accumulated charge taking place.

A plurality of received signals are therefore produced for the same sensor element and for the same motion picture at defined points in time by such a control. If the received signal is located in a saturation region of the sensor device for the actually desired exposure time, the correct received signal value can still be determined subsequently by calculation by extrapolation on the basis of the further received signals corresponding to a shorter exposure time. It is likewise possible, in the event of an underexposure and of a received signal, which is accordingly too low, to extrapolate the correct signal value from such received signals which were determined for higher exposure times.

A CMOS sensor is particularly suitable for this type of control since the received signals of the individual sensor elements can be read out free of destruction, that is in a signal maintaining manner, for example in the form of actual voltage values. It has moreover been found to be of advantage with a CMOS sensor that this allows comparatively high read-out rates. No significant time loss is associated with the explained repeated signal gain since ultimately a comparatively long exposure time is set as a precaution for each sensor element, for which, however, a plurality of read-out processes take place.

In accordance with a further preferred embodiment, the sensor elements of the sensor device can be selected freely selectably by means of the control device such that the received signals can therefore be produced and read out in any desired order or at any desired points in time. It is thereby possible, for example, to record particular picture sections or to determine a plurality of received signals—for example for different exposure times—for control purposes with respect to specific sensor elements. Such a freely selectable read-out of the sensor elements is in particular possible when a CMOS sensor is used.

In accordance with a further advantageous embodiment of the motion picture camera in accordance with the invention, this has only a single optoelectronic sensor, in particular the already cited CMOS sensor. When a single sensor is used for all colors, the interposed divider prisms required when a plurality of sensors is used can be dispensed with. An improvement in the picture quality is thereby achieved. The omission of the divider prisms furthermore has the effect that the distance of such a single sensor from the recording optical system can be reduced such that higher quality optical systems can be used.

To make possible a distinguishing of colors with a single sensor in such an embodiment, each sensor element can alternately be provided with a color filter, in particular with a red, green or blue filter. It is, however, also possible to use a color-sensitive sensor device, for example a semi-conductor sensor which has different spectral absorption at different depths, with each sensor element corresponding to a picture element being able to produce a plurality of received signals which correspond to different wavelengths or colors. For example, such a color resolving sensor element can produce a red, green or blue received signal.

Alternatively to this, two or three sensors can also be provided for the realization of different spectral sensitivities.

Furthermore, a cooling device can be provided for the active cooling of the sensor device which comprises, for example, a Peltier element or a fan.

In a preferred embodiment, the motion picture camera in accordance with the invention has at least one digital memory device for the storing of the recorded and digitized received signals. Such a memory device can preferably be coupled to the camera in an exchangeable manner to allow a fast replacement. The said digitizing device is connected to the memory device via at least one data interface for the forwarding of the respectively digitized received signals, with a number of data interfaces preferably being provided which corresponds to the number of the digitizing devices.

The storage of the received signals in the memory device preferably takes place with a large bandwidth, that is without a reduction of the data acquired in the picture recording. In other words, a large memory requirement is accepted so as not to risk any irreversible loss of motion picture data due to data compression or to picture treatment such as color or brightness modifications. A possible data compression or picture treatment should only take place using a copy of the original recorded data stored in the memory device.

In accordance with a preferred embodiment, the memory device can be controlled by the control device for an additional storage of at least one recording parameter in order to store the actual picture recording frequency, the actual diaphragm setting of the recording lens or text information on the recorded film scene (take), for example, with the motion picture data. Such recording parameters can be used for documentation purposes or for a corresponding setting of the camera for a later restart of the shoot.

Furthermore, the motion picture camera in accordance with the invention can be fitted with a clock which makes available a time signal which can be stored together with the motion picture data or with recording parameters in order to allow an association of these data with defined moments in time.

Furthermore, an identification device can be provided by the memory device which allows the transmission of an identification code corresponding to this memory device to the motion picture camera. The control device of the camera can thereby, for example, recognize an exchange of the memory device, the total capacity or the still remaining capacity of the memory device. A further application possibility of such an identification device consists of the fact that recording parameters previously transmitted to the memory device can again be loaded back into the camera in order, for example, to allow an automatic adjustment of the camera in accordance with an earlier setting. The said identification device can, for example, have a microcontroller and a non volatile memory.

One difficulty in the obtaining of the received signals with a high data depth and a correspondingly high data rate is that the memory device has to have a capacity sufficient for the usual recording periods. The memory device must therefore be fitted either with a comparatively large capacity or a change of the memory device must be possible during the ongoing recording.

In a further advantageous embodiment, no physical coupling is therefore provided between the camera and the memory device, but the motion picture data or recording parameters to be stored are transmitted to the memory device in a wireless manner. For this purpose, the motion picture camera can have a wireless transmitter and the memory device can have a corresponding wireless receiver. This embodiment has the advantage that the construction size of the memory device or of a plurality of memory devices to be used does not limit the handling of the camera. The weight of the camera can also be considerably reduced in this manner.

Moreover, such a wireless coupling of memory devices to the motion picture camera can simplify an interruption free change of the memory devices at the motion picture camera so as not to prematurely have to end a film recording or to lose picture data due to the depleted capacity of a single memory device. Such an interruption free change of the data transmission to a plurality of memory devices in succession can take place, for example according to the principle of "roaming", such as is known in connection with the change of a transmitter/receiver station with mobile radio telephones.

It is alternatively or additionally preferred for an intermediate memory device to be provided which serves as a data buffer in order, ultimately, to provisionally record data to be stored in a memory device and to transmit them to said memory device. Such an intermediate memory device is—for the benefit of increased data security—in particular of advantage on an exchange of memory devices during a running film recording. For example, such an intermediate memory device can be provided by the motion picture camera or by a memory device arranged remotely from the camera in the case of the explained wireless transmission of data to be stored to different memory devices.

It must still be noted with respect to the explained memory device that this can have at least one output interface for the outputting of the stored data. This output interface can also be made, for example, as a wireless transmitter in order to allow a wireless transmission of the data.

In an advantageous embodiment, the memory device can be controlled for the outputting of the stored data at an output rate which is different from the rate of the reading in of the data to be stored, for example to allow a subsequent backup of the data in a—comparatively slow—magnetic tape memory.

The memory device can in particular have a magnetic memory (for example a hard disk), an optical memory (for example a recordable CD or DVD or a holographic memory), a magneto-optical memory, a semi-conductor memory (for example a RAM memory or a flash memory) or a plurality or a combination of these storage media.

Finally, it is preferred for the motion picture camera to have a modular design in order to allow a simple and fast replacement of electronic, optical and mechanical modules and in order furthermore to allow the use of conventional camera components. In particular, the sensor device together with the control device, further a recording optical system, the beam deflection device—with or without focusing screen, a viewfinder optical system or a memory device, can form its own such module unit respectively.

Further preferred embodiments of the invention are recited in the dependent claims.

BRIEF DESCRIPTION OF THE DRAWINGS

The invention will be explained in the following by way of example with reference to the drawings in which are shown.

DETAILED DESCRIPTION OF PREFERRED EMBODIMENTS

Figure 1:
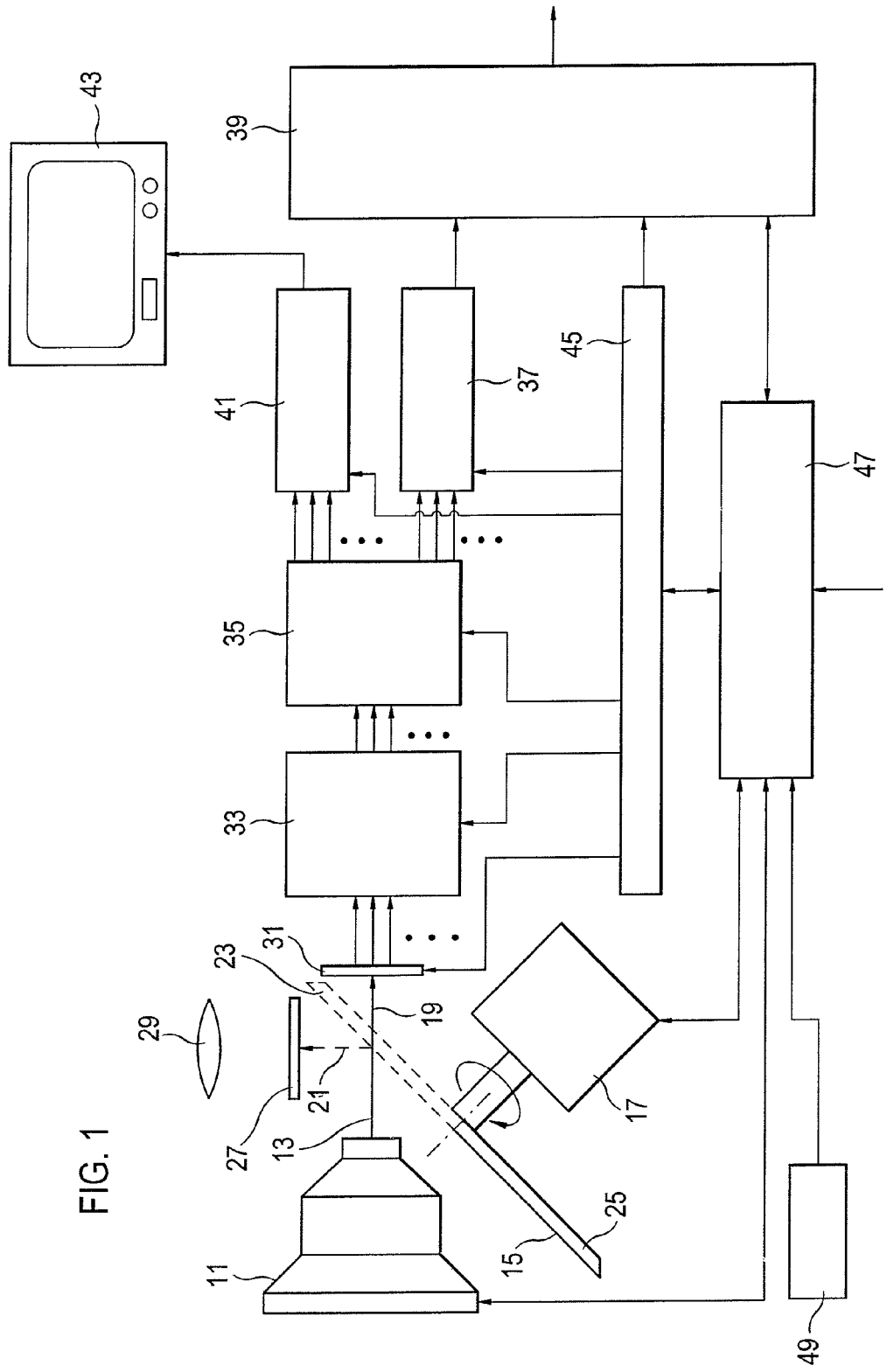
FIGS. 1 and 2 two different embodiments of the motion picture camera in accordance with the invention.

FIG. 1 shows a possible design of the motion picture camera in accordance with the invention. This has a recording optical system 11 which images the motion picture actually to be recorded along a reception beam path 13. The light incident along the reception beam path 13 is alternately transmitted in the direction of a recording beam path 19 or deflected in the direction of a viewfinder beam path 21 by means of a mirror aperture 15 which can be driven by a drive unit 17 to make a rotational movement. For this purpose, the mirror aperture 15 has a transmission opening 23 and a mirror coated deflection region 25.

Provided that the deflection region 25 is located in the reception beam path 13, the picture taken by the recording optical system 11 is imaged on a ground glass screen 27 such that a real image is created on this which can be observed by the cameraman by means of a viewfinder optical system 29.

In contrast, at the points in time at which—as shown in FIG. 1—the transmission opening 23 is located in the reception beam path, the motion picture to be recorded is imaged by the recording optical system 11 without any further deflection on an optoelectronic sensor device 31 which is located, with respect to the recording optical system 11, in the same optical position as the focusing screen 27. In a matrix-like arrangement, the sensor device 31 has a plurality of sensor elements which can, as a consequence of the light exposure through the transmission opening 23 of the mirror aperture 15, produce a respective received signal which corresponds to the light intensity and the exposure time. For example, the sensor device 31 can have an arrangement of 1920×1080 or 2880×2160 of such sensor elements.

The received signals produced by the sensor device 31 are delivered in parallel, or partly in parallel, to an amplification device 33 which has a corresponding number of electronic amplifiers. The received signals amplified in this manner are digitized in a downstream digitizing device 35 by a corresponding number of analog/digital converters.

The digitizing device 35 is connected via a data interface 37 to a memory device 39 which records the recorded and digitized received signals on, for example, a magnetic hard disk in real time.

The received signals can be delivered via a further data interface 41 connected to the digitizing device 35 to a display monitor 43 in order to allow a simultaneous observation of the recorded motion picture film on this—also at a location remote from the camera.

The data flow from the sensor device 31 via the amplifier device 33 and the digitizing device 35 to the data interface 37 and the memory device 39, on the one hand, and to the data interface 41 and the display monitor 43, on the other hand, is controlled by an electronic control device 45 which is connected, for this purpose, to the said components 31, 33, 35, 37, 39, 41, 43. The electronic control device 45 in particular controls the read-out of the received signals of the individual sensor elements of the sensor device 31.

A camera control device 47 is moreover provided which is connected to the recording optical system 11, to the drive unit 17 for the rotating mirror aperture 15, to the electronic control device 45, to the memory device 39 and, furthermore, to a camera sensor 49 which, for example, detects the brightness of the of the film scene to be recorded or individual regions therefrom. The camera control device 47 synchronizes the procedure of the digital motion picture recording with the control or signal processing of the further camera components, and it allows the input of setting parameters by the cameraman via a user interface not shown in FIG. 1.

The camera in accordance with FIG. 1 thus forms a digital motion picture camera which allows the recording and storage of picture signal data in a digital format and which simultaneously allows a direct visual observation of the recorded film scene via the viewfinder optical system 29 as well as an electrooptical control observation of the recorded data on the display monitor 43.

In accordance with the invention, the frequency at which the individual sequential motion pictures can be recorded by means of the sensor device 31 can be varied by interaction of the camera control device 47 and of the electronic control device 45 with the sensor device 31, and indeed in accordance with a pre-set value adjustable via the user interface and the camera control device 47. The picture recording frequency can thereby be reduced or increased continuously prior to or during a recording in order to carry out fast motion shots or slow motion shots.

With such a variation of the picture recording frequency, the frequency at which the received signals of the sensor device 31 are read out which jointly form a picture data set is modified by means of the electronic control device 45, on the one hand. The rotational frequency of the drive unit 17, and thus of the mirror aperture 15, is matched via the camera control device 47, on the other hand, to bring about an exposure or a masking of the sensor device 31 at a reduced or increased rate.

In the embodiment shown in FIG. 1, the sensor device 31 is formed by a CMOS sensor whose reception elements can be individually controlled in order to bring about a resetting or a subsequent read-out of the photoelectric charge, or of a corresponding voltage signal, at any desired point in time.

In such a CMOS sensor, the light acting on a sensor element is trans-formed into a photoelectric charge and thereby, ultimately, into a voltage signal, whose value increases during the time of the light exposure. An individual sensor element can be short circuited and thus reset in order to set the voltage value to zero and thus to let the exposure period start at a defined point in time. The read-out of this sensor element can likewise take place at any desired defined point in time in order thus to receive a received signal which corresponds to a pre-determined exposure period. Since, therefore, both the starting point in time and the end point in time of the exposure period can be set as desired, ultimately the frequency at which the picture data sets of all sensor elements are jointly produced can also be varied, as will be explained in the following. The CMOS sensor 31 thus allows a variation of the picture recording frequency, which is not possible at a fixed read-out cycle—as with a CCD sensor for example.

In the sensor device 31 shown, the control of the exposure time and of the picture taking frequency preferably takes place purely electronically. Alternatively or in support, however, it is also possible to control or to influence the masking or light exposure of the sensor device 31 via the mirror aperture 15 and its deflection region 25 and transmission region 23.

It must still be mentioned with respect to the camera in accordance with FIG. 1 that the sensor device 31, the amplifier device 33 and, preferably also, the digitizing device 35, can be realized by a single module. In this case, each sensor element has associated with in an integrated design its own amplifier or its own analog/digital converter. Furthermore, circuits for impedance matching can be provided.

The read-out, the amplification or the digitizing of the received signals of the sensor elements can moreover naturally also take place completely or partly sequentially.

It must still be mentioned with respect to the storage of the digital picture data that such a data format can be pre-set by the electronic control device 45 which does not only allow the storage of the digitized received signals of the sensor device 31, but also the additional storage of associated recording parameters. For example, the diaphragm aperture of the recording optical system 11 set by means of the camera control device 47, the brightness values detected by means of the camera sensor 49, a reference time signal pre-set by a clock (not shown) or the actual picture recording frequency can also be stored as recording parameters in the memory device 39.

A wireless connection, in particular a radio connection, can be provided between the memory device 39 and the data interface 37 as well as between the display monitor 43 and the data interface 41. It is moreover also possible to reduce the picture data transmitted by the data interface 41 to the display monitor 43 with respect to their data depth corresponding to the resolution and color variation generally reproducible by the display monitor 43.

Figure 2:
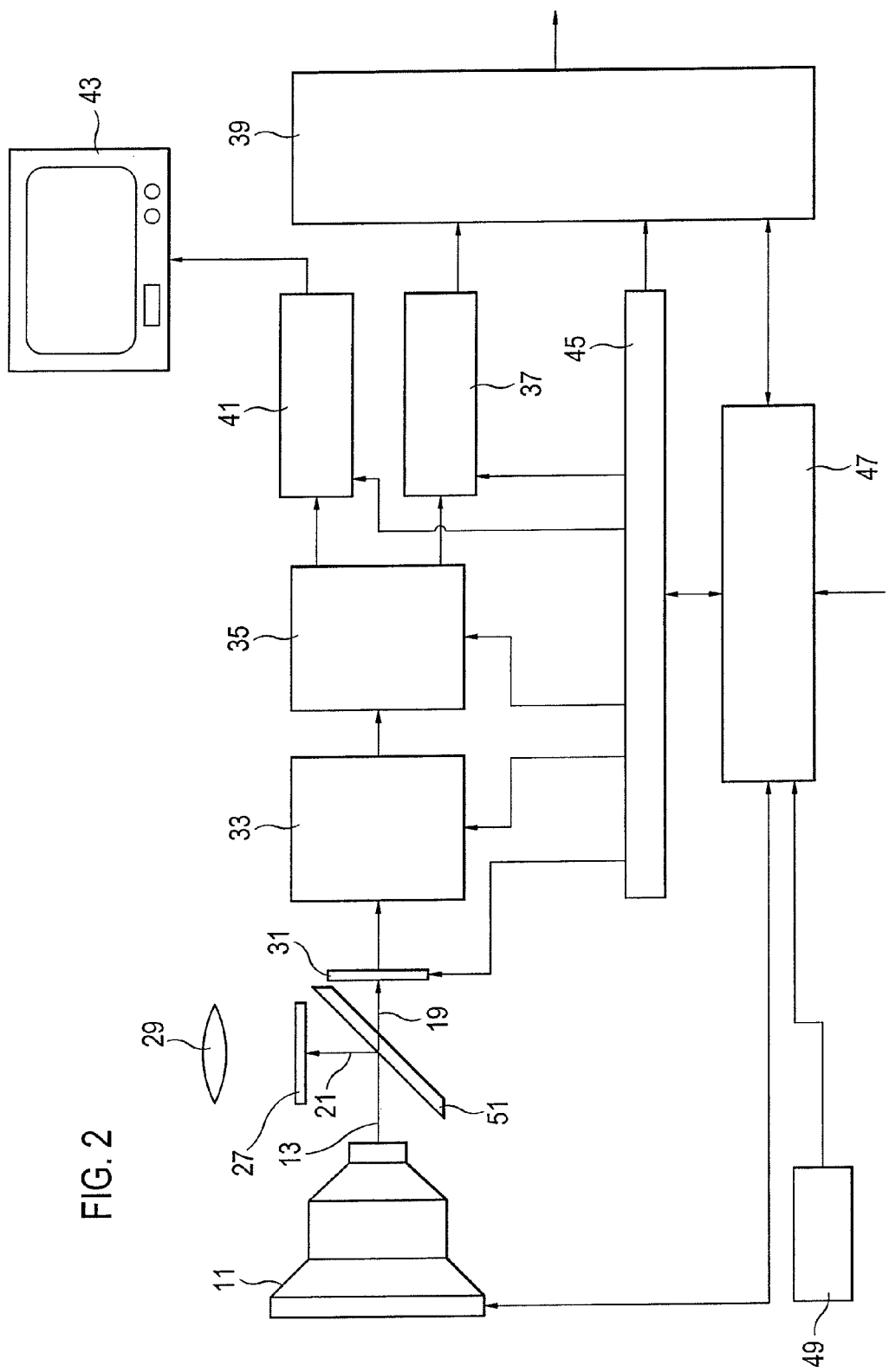

FIG. 2 shows a further embodiment of the motion picture camera in accordance with the invention, with components corresponding to the embodiment in accordance with FIG. 1 being marked with the same reference numerals.

Unlike the embodiment in accordance with FIG. 1, a partly transmissible beam splitter mirror 51 is provided as the beam deflection device which transmits part of the picture imaged by the recording optical system 11 at any time in the direction of the sensor device 31 and deflects another part onto the ground glass screen 27. In this embodiment, a rotating mirror aperture is thus omitted such that also no electromagnetic drive unit is required for the drive of such a mirror aperture.

Furthermore, with the embodiment in accordance with FIG. 2, a purely sequential read-out of the sensor elements of the sensor device 31 as well as a serial transmission of the received signals to an amplifier device 33 and to a digitizing device 35 is required. The amplifier device 33 and the digitizing device 35 therefore each require only one individual signal amplifier or one single analog/digital converter. However, a parallel read-out, amplifying or digitizing of the received signals can also be provided here—at least in part.

It must still be mentioned with respect to the embodiment in accordance with FIG. 2 that this can additionally have a rotational aperture having at least one transmission opening and one masking zone in the recording beam path 19 between the beam splitter mirror 51 and the sensor device 31. The exposure time of the sensor device can be controlled or additionally electromechanically supported with respect to an electronic control by rotational drive of such a rotational diaphragm.

Figure 3:
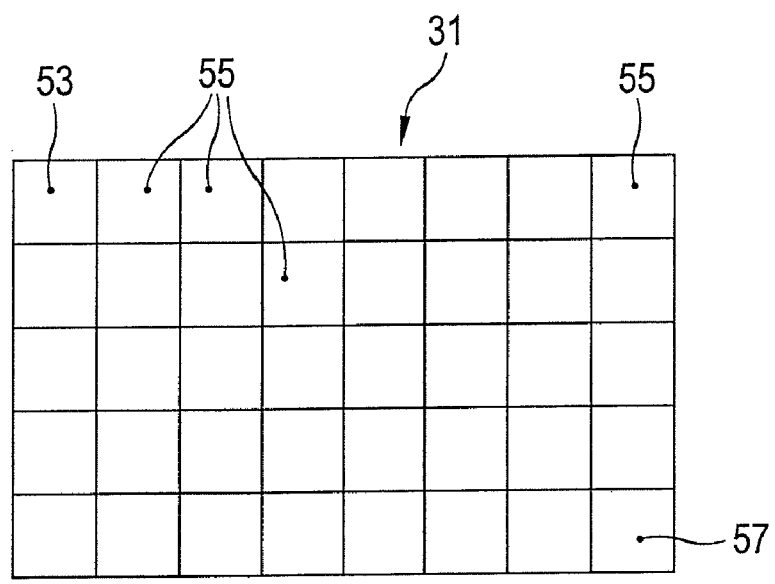
FIG. 3 a possible embodiment of a sensor device.

FIG. 3 schematically shows a possible matrix-shaped division of the light sensitive front side of a sensor device 31 into a plurality of sensor elements 53, 55, 57, with only a low number of sensor elements being shown for a simplified representation.

A sequential read-out of the received signals of these sensor elements 53, 55, 57 can, as mentioned in connection with FIG. 2, take place for example as follows: starting with the sensor element 53, which is shown at the top left in the representation in accordance with FIG. 3, initially all sensor elements 53, 55 of the topmost line are reset sequentially from left to right and in defined intervals of time. In other words, the voltage values photoelectrically produced up to this time at these sensor elements 53, 55 are set to zero.

Subsequently, the sensor elements 55 of the second and following lines are reset in a corresponding manner, that is sequentially in each case from left to right, until finally the sensor element 57 at the bottom right is reached and is likewise reset or cancelled. After the resetting of each sensor element 53, 55, 57, the production and collection of photoelectrical charge is directly begun—provided a light exposure takes place—such that, for example, a certain signal charge has been produced in the sensor element 53 at the point in time of the resetting of the sensor element 57.

After such a sequential resetting of all sensor elements 53, 55, 57, the received signals of these sensor elements are read out, and indeed again at defined points in time and in the explained order, that is line-wise from left to right starting with sensor element 53 up to sensor element 57. A photoelectrical voltage value, or a received signal, is read out for each sensor element 53, 55, 57 and corresponds to a specific known exposure time. Such a sequential resetting and read-out of the sensor elements 53, 55, 57 can be initiated, for example, by the electronic control device 45 in accordance with FIGS. 1 and 2.

Figure 4:
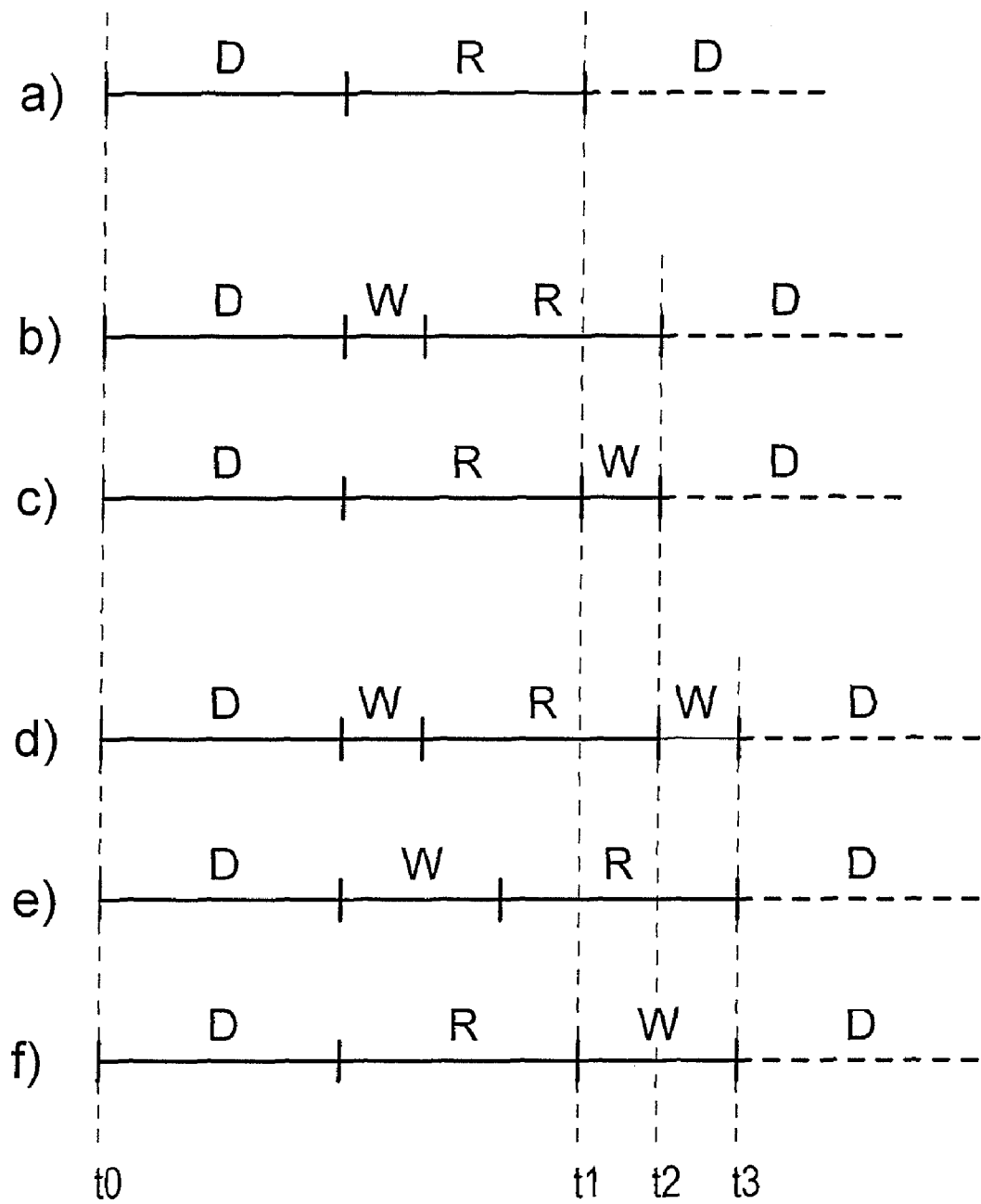

FIG. 4 shows in a time diagram how, with a sequential resetting and read-out of sensor elements 53, 55, 57 in accordance with FIG. 3, a variable picture recording frequency can be realized. Six possible control procedures (a) to (f) are shown by way of example, each beginning from a point in time t0. Cancellation intervals D, read-out intervals R and waiting intervals W are shown for these control procedures and each follow one another in a time sequence.

A cancellation interval D corresponds to the period of the sequential resetting of all sensor elements 53, 55, 57, as explained with reference to FIG. 3. In a corresponding manner, a read-out interval R corresponds to the period of the sequential read-out of the sensor elements 53, 55, 57 in accordance with FIG. 3. The cancellation intervals D and the read-out intervals R always have a constant period of time, provided that one is working with a constant resetting and read-out cycle.

The picture recording frequency and/or the exposure time can be varied in that one waits for the period of different waiting intervals W between a resetting procedure and a read-out procedure, or between a read-out procedure and a resetting period.

It is shown, for example, in FIG. 4 for the control sequence (b) that, after the sequential resetting of all sensor elements 53, 55, 57 within the cancellation interval D, a waiting interval W initially passes before, during a read-out interval R, the sensor elements 53, 55, 57 are read out sequentially and directly subsequently, during a further cancellation interval D, are again reset sequentially. A complete picture recording cycle thereby takes up a period t2.

The same period t2 for a complete picture recording cycle is also required if the read-out interval R follows directly after the end of the cancellation interval D and if a waiting interval W only passes after this read-out before the sensor elements 53, 55, 57 are again reset. This is shown in FIG. 4 for the control sequence (c).

The same period t2 of a complete picture recording cycle is thus required by the control sequences (b) and (c) such that in both cases the same picture recording frequency is achieved. However, the exposure time is extended in the control sequence (b) since a waiting interval W first passes before the read-out of the sensor elements 53, 55, 57.

A longer period t3 of a complete picture recording cycle, and thus a reduced picture recording frequency, can be achieved in that the sensor device 31 is controlled such that longer and/or more waiting intervals W pass between the resetting and the read-out of the sensor elements 53, 55, 57. This is shown by way of example for the control sequences (d), (e) and (f).

For example, in the control sequence (d), it is waited both before and after the sequential read-out of the sensor elements 53, 55, 57 for the period of a waiting interval W, before again beginning with the read-out or resetting. The same exposure time is thereby achieved as in the control sequence (b), but with a reduced picture recording frequency.

The control sequence (e) in accordance with FIG. 4, in contrast, shows the passing of a longer waiting interval W after the end of the sequential resetting of all sensor elements 53, 55, 57, with the resetting again being started directly after the subsequent read-out of the sensor elements. In this control sequence, the same period t3 of a complete picture recording cycle, and thus the same picture recording frequency, is achieved as with the control sequence (d). However, the exposure time is increased here due to the extended waiting interval W.

The same picture recording frequency is also achieved in the control frequency (f) as in the control frequencies (d) and (e). This comparatively low picture recording frequency is achieved at a short exposure time in that a comparatively lone waiting interval W passes between the ending of the read-out of the last sensor element 57 and the time of the resetting of the first sensor element 53.

The highest possible picture recording frequency corresponding to the shortest possible period t1 of a complete picture recording cycle results if the cancellation interval D and the read-out interval R follow directly after one another in each case without intermediate waiting intervals. This is shown as control sequence (a) in FIG. 4.

It must still be mentioned with respect to the control sequences shown in FIG. 4 that these can be realized purely electronically, namely by corresponding control of the sensor elements 53, 55, 57 by means of the electronic control device 45 shown in FIGS. 1 and 2.

The period of the different waiting intervals W can, for example, be selected in increments of that high frequency cycle at which the sensor elements 53, 55, 57 are sequentially reset or read out in order to be able to continuously change the picture recording frequency. It is likewise possible to variably control the high frequency cycle at which the sensor elements 53, 55, 57 are sequentially reset or read out.

It must moreover be mentioned with respect to the explained control sequences that—due to the use of a CMOS sensor 31—the control of the sensor elements in accordance with FIG. 3 can also take place in any other desired order, for example starting with the sensor element 55, which is shown at the top right in the representation in accordance with FIG. 3, sequentially from right to left or from top to bottom, or completely freely selectable in order to achieve certain effects.

Furthermore, alternatively to the purely sequential exposure of the sensor elements 53, 55, 57 explained with reference to FIGS. 3 and 4, a so-called simultaneous shutter can be realized. For this, the received signals of all sensor elements 53, 55, 57 can be reset simultaneously. Moreover, there is associated with each sensor element 53, 55, 57 a memory element, for example in the form of a capacitor, into which the photoelectric charge produced in each case for the sensor element 53, 55, 57 in question can be displaced, with the memory elements being connected or controllable such that no further increase of the respective received signal takes place in the memory elements after this charge transfer even with a further light exposure of the sensor 31. This charge transfer can also be carried out simultaneously for all sensor elements 53, 55, 57.

Since both the starting point in time and the end point in time of the exposure is thus the same for all sensor elements 53, 55, 57, the sensor elements are not subject to any phase shift relative to one another with respect to their respective exposure period.

After the simultaneous charge transfer, the read-out of the received signals, for example by taking up the voltage values applied at the memory elements, can take place in any desired order, for example, sequentially, in parallel in groups or completely in parallel. The sensor elements 53, 55, 57 are subsequently again simultaneously reset.

A desired change in the picture recording frequency and/or in the exposure time can be realized in such a simultaneous shutter in that the starting point in time and/or the end point in time of the simultaneous exposure of the sensor elements 53, 55, 57 can be varied. For example, it can be waited for the period of different waiting intervals W between the simultaneous resetting of all sensor elements 53, 55, 57 and the simultaneous displacement of the photoelectrical charge into the memory elements, or between the simultaneous displacement and the simultaneous resetting.

Figure 5:
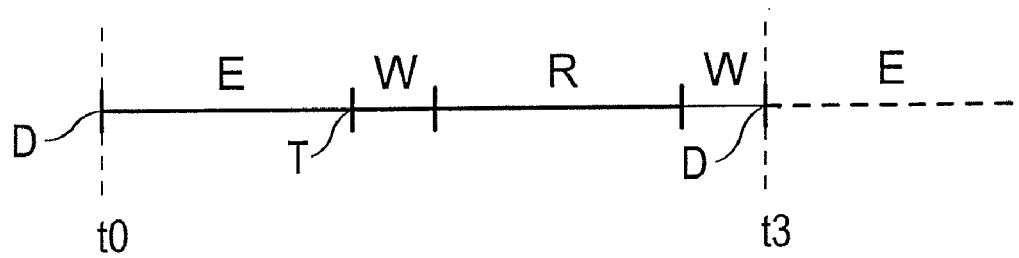
FIGS. 4 and 5 time diagrams for the illustration of different control sequences with different picture recording periods.

FIG. 5 shows such a simultaneous control sequence corresponding to the sequential control sequence (d) in accordance with FIG. 4 with respect to the period t3 of a picture recording cycle and thus with respect to the picture recording frequency. The simultaneous resetting of all sensor elements 53, 55, 57 is here triggered at a cancellation point in time D. During a subsequent exposure interval E, the sensor elements 53, 55, 57 are exposed simultaneously. At a transfer point in time T, the photoelectric charges of the sensor elements 53, 55, 57 are, as explained, simultaneously displaced into the respectively associated memory element. After the passing of a first waiting interval W, the memory elements are read out during a read-out interval R. After the passing of a further waiting interval W, and indeed at a cancellation point in time D, the sensor elements 53, 55, 57 are again simultaneously reset in order to initiate a new exposure interval E.

In a corresponding manner as explained in connection with FIG. 4, the waiting intervals W shown in FIG. 5 can respectively be varied, in particular lengthened, shortened or set to zero in order to vary the period t3 of a picture recording cycle, and thus the picture recording frequency and furthermore the exposure time E for all sensor elements 53, 55, 57 synchronously.

REFERENCE NUMERAL LIST 11 recording optical system
13 reception beam path
15 mirror aperture
17 drive unit
19 recording beam path
21 viewfinder beam path
23 transmission opening
25 deflection region
27 focusing screen
29 viewfinder optical system
31 sensor device
33 amplifier device
35 digitizing device
37 data interface
39 memory device
41 data interface
43 display monitor
45 electronic control device
47 camera control device
49 camera sensor
51 beam splitter mirror
53 sensor element
55 sensor element
57 sensor element
D cancellation interval or point in time
E exposure interval
R read-out interval
T transfer point in time
W waiting interval
t0, t1, t2, t3 point in time

What is claimed is:

1. A digital motion picture camera, at least comprising
an optoelectronic sensor device (31) for the recording of motion pictures, with the optoelectronic sensor device having, in an areal arrangement, a plurality of sensor elements (53, 55, 57) for the generation of a respective received signal in dependence on a light exposure;
a control device (45, 47) for the control of the read-out of the received signals of the sensor elements, with the optoelectronic sensor device (31) being controllable by means of the control device (45, 47) for the recording of the motion pictures at a pre-settable variable picture recording frequency;
a digitizing device (35) for the digitizing of the received signals of the sensor elements;
an optical viewfinder (27, 29) for the visual observation of the motion pictures to be recorded; and
a rotationally movable mirror diaphragm (15) which is disposed upstream of the optoelectronic sensor device (31), the rotationally movable mirror diaphragm dividing a received beam path (13) at least into a recorded beam path (19) for the optoelectronic sensor device and a viewfinder beam path (21) for the optical viewfinder;
wherein the sensor elements (53, 55, 57) are controlled for the successive generation of a plurality of received signals which correspond to different exposure times and are associated with a single motion picture, and
wherein after the start of the exposure of the respective sensor elements (53, 55, 57) the received signals of the sensor elements are taken up at a plurality of sequential points in time without a repeated resetting or cancellation of accumulated charge taking place.

2. A digital motion picture camera in accordance with claim 1, wherein in the case that one of the received signals is located in a saturation region of the optoelectronic sensor device for an actually desired exposure time, a correct received signal value is determined by calculation on the basis of further received signals corresponding to a shorter exposure time.

3. A digital motion picture camera in accordance with claim 1, wherein in the event of an underexposure and of a received signal, which is accordingly too low, a correct signal value is extrapolated from the received signals of the sensor elements which were determined for higher exposure times.

4. A digital motion picture camera in accordance with claim 1, wherein the starting point in time of the exposure of the sensor elements (53, 55, 57) and/or the end point in time of the exposure of the sensor elements is controllable by means of the control device (45, 47) for the variation of the picture recording frequency.

5. A digital motion picture camera in accordance with claim 1, wherein the cycle of a sequential resetting or read-out of the received signals of the sensor elements (53, 55, 57) is controllable for the variation of the picture recording frequency.

6. A digital motion picture camera in accordance with claim 1, wherein each sensor element (53, 55, 57) has its own amplifier device (33) and/or its own digitizing device (35) associated with it which is preferably integrated in each case into the optoelectronic sensor device (31).

7. A digital motion picture camera in accordance with claim 1, wherein the optoelectronic sensor device (31) has a CMOS sensor.

8. A digital motion picture camera in accordance with claim 1, wherein the rotational frequency of the rotationally movable mirror diaphragm (15) is variably controllable by the control device (45, 47).

9. A digital motion picture camera in accordance with claim 1, wherein the cycle of the read-out of the received signals of the sensor elements (53, 55, 57) and the rotational frequency of the rotationally movable mirror diaphragm (15) can be synchronized with one another by means of the control device (45, 47).

10. A digital motion picture camera, at least comprising
an optoelectronic sensor device (31) for the recording of motion pictures, with the optoelectronic sensor device having, in an areal arrangement, a plurality of sensor elements (53, 55, 57) for the generation of a respective received signal in dependence on a light exposure;
a control device (45, 47) for the control of the read-out of the received signals of the sensor elements, with the optoelectronic sensor device (31) being controllable by means of the control device (45, 47) for the recording of the motion pictures at a pre-settable variable picture recording frequency;
a digitizing device (35) for the digitizing of the received signals of the sensor elements;
an optical viewfinder (27, 29) for the visual observation of the motion pictures to be recorded; and
a rotationally movable mirror diaphragm (15) which is disposed upstream of the optoelectronic sensor device (31), the rotationally movable mirror diaphragm dividing a received beam path (13) at least into a recorded beam path (19) for the optoelectronic sensor device and a viewfinder beam path (21) for the optical viewfinder;
wherein the sensor elements (53, 55, 57) are controlled for the successive generation of a plurality of received signals which correspond to different exposure times and are associated with a single motion picture, and
wherein in the case that one of the received signals is located in a saturation region of the optoelectronic sensor device for an actually desired exposure time, a correct received signal value is determined by calculation on the basis of further received signals corresponding to a shorter exposure time.

11. A digital motion picture camera in accordance with claim 10, wherein in the event of an underexposure and of a received signal, which is accordingly too low, a correct signal value is extrapolated from the received signals of the sensor elements which were determined for higher exposure times.

12. A digital motion picture camera in accordance with claim 10, wherein the starting point in time of the exposure of the sensor elements (53, 55, 57) and/or the end point in time of the exposure of the sensor elements is controllable by means of the control device (45, 47) for the variation of the picture recording frequency.

13. A digital motion picture camera in accordance with claim 10, wherein the cycle of a sequential resetting or read-out of the received signals of the sensor elements (53, 55, 57) is controllable for the variation of the picture recording frequency.

14. A digital motion picture camera in accordance with claim 10, wherein each sensor element (53, 55, 57) has its own amplifier device (33) and/or its own digitizing device (35) associated with it which is preferably integrated in each case into the optoelectronic sensor device (31).

15. A digital motion picture camera in accordance with claim 10, wherein the optoelectronic sensor device (31) has a CMOS sensor.

16. A digital motion picture camera in accordance with claim 10, wherein the rotational frequency of the rotationally movable mirror diaphragm (15) is variably controllable by the control device (45, 47).

17. A digital motion picture camera in accordance with claim 10, wherein the cycle of the read-out of the received signals of the sensor elements (53, 55, 57) and the rotational frequency of the rotationally movable mirror diaphragm (15) can be synchronized with one another by means of the control device (45, 47).

18. A digital motion picture camera, at least comprising
an optoelectronic sensor device (31) for the recording of motion pictures, with the optoelectronic sensor device having, in an areal arrangement, a plurality of sensor elements (53, 55, 57) for the generation of a respective received signal in dependence on a light exposure;
a control device (45, 47) for the control of the read-out of the received signals of the sensor elements, with the optoelectronic sensor device (31) being controllable by means of the control device (45, 47) for the recording of the motion pictures at a pre-settable variable picture recording frequency;
a digitizing device (35) for the digitizing of the received signals of the sensor elements;
an optical viewfinder (27, 29) for the visual observation of the motion pictures to be recorded; and
a rotationally movable mirror diaphragm (15) which is disposed upstream of the optoelectronic sensor device (31), the rotationally movable mirror diaphragm dividing a received beam path (13) at least into a recorded beam path (19) for the optoelectronic sensor device and a viewfinder beam path (21) for the optical viewfinder;
wherein the sensor elements (53, 55, 57) are controlled for the successive generation of a plurality of received signals which correspond to different exposure times and are associated with a single motion picture, and
wherein in the event of an underexposure and of a received signal, which is accordingly too low, a correct signal value is extrapolated from the received signals of the sensor elements which were determined for higher exposure times.

19. A digital motion picture camera in accordance with claim 18, wherein the starting point in time of the exposure of the sensor elements (53, 55, 57) and/or the end point in time of the exposure of the sensor elements is controllable by means of the control device (45, 47) for the variation of the picture recording frequency.

20. A digital motion picture camera in accordance with claim 18, wherein the cycle of a sequential resetting or read-out of the received signals of the sensor elements (53, 55, 57) is controllable for the variation of the picture recording frequency.

21. A digital motion picture camera in accordance with claim 18, wherein each sensor element (53, 55, 57) has its own amplifier device (33) and/or its own digitizing device (35) associated with it which is preferably integrated in each case into the optoelectronic sensor device (31).

22. A digital motion picture camera in accordance with claim 18, wherein the optoelectronic sensor device (31) has a CMOS sensor.

23. A digital motion picture camera in accordance with claim 18, wherein the rotational frequency of the rotationally movable mirror diaphragm (15) is variably controllable by the control device (45, 47).

24. A digital motion picture camera in accordance with claim 18, wherein the cycle of the read-out of the received signals of the sensor elements (53, 55, 57) and the rotational frequency of the rotationally movable mirror diaphragm (15) can be synchronized with one another by means of the control device (45, 47).

* * * * *